US010669911B2

(12) United States Patent
Lindahl et al.

(10) Patent No.: US 10,669,911 B2
(45) Date of Patent: Jun. 2, 2020

(54) DIESEL EXHAUST FLUID DELIVERY SYSTEM WITH PRESSURE CONTROL

(71) Applicant: Robert Bosch GmbH, Stuttgart (DE)

(72) Inventors: Andres Murube Lindahl, Farmington Hills, MI (US); Oliver Wintersteller, Howell, MI (US)

(73) Assignee: Robert Bosch GmbH, Stuttgart (DE)

( * ) Notice: Subject to any disclaimer, the term of this patent is extended or adjusted under 35 U.S.C. 154(b) by 645 days.

(21) Appl. No.: 15/328,815

(22) PCT Filed: Aug. 4, 2015

(86) PCT No.: PCT/IB2015/055919
§ 371 (c)(1),
(2) Date: Jan. 24, 2017

(87) PCT Pub. No.: WO2016/024188
PCT Pub. Date: Feb. 18, 2016

(65) Prior Publication Data
US 2017/0218814 A1    Aug. 3, 2017

Related U.S. Application Data

(60) Provisional application No. 62/037,691, filed on Aug. 15, 2014.

(51) Int. Cl.
*F01N 3/20* (2006.01)
*B01D 53/34* (2006.01)
*B01D 53/92* (2006.01)

(52) U.S. Cl.
CPC .......... *F01N 3/208* (2013.01); *B01D 53/346* (2013.01); *B01D 53/92* (2013.01);
(Continued)

(58) Field of Classification Search
CPC ............ F01N 3/208; F01N 2610/1406; F01N 2900/1822; F01N 2900/1808;
(Continued)

(56) References Cited

U.S. PATENT DOCUMENTS 8,171,721 B2    5/2012   Boddy et al.
8,726,641 B2    5/2014   Zanetti et al.
(Continued)

FOREIGN PATENT DOCUMENTS

CN    1082663 A      2/1994
CN    101084053 A    12/2007
(Continued)

OTHER PUBLICATIONS

International Search Report and Written Opinion for Application No. PCT/IB2015/055919 dated Nov. 13, 2015 (11 pages).
(Continued)

*Primary Examiner* — Daniel C. McCracken
(74) *Attorney, Agent, or Firm* — Michael Best & Friedrich LLP (57) ABSTRACT

A diesel exhaust fluid delivery system and a dual-variable control strategy for adjusting the delivery pressure and the mass flow rate of the fluid passing through the system. The method for operating the system using two operating modes: low flow rate and high flow rate. While operating in the low flow rate operating mode, the speed of a DEF pump remains constant and DEF delivery to the exhaust system is adjusted by controlling a backflow valve. While operating in the high flow rate operating mode, the backflow valve is closed and the speed of the pump is adjusted to regulate DEF delivery to the exhaust system.

12 Claims, 9 Drawing Sheets

(52) U.S. Cl.
CPC .... *F01N 2610/02* (2013.01); *F01N 2610/144* (2013.01); *F01N 2610/1406* (2013.01); *F01N 2610/1473* (2013.01); *F01N 2900/1808* (2013.01); *F01N 2900/1812* (2013.01); *F01N 2900/1822* (2013.01); *Y02T 10/24* (2013.01)

(58) Field of Classification Search
CPC ....... F01N 2610/1473; F01N 2610/144; F01N 2610/02; F01N 2900/1812; B01D 53/92; B01D 53/346; Y02T 10/24
See application file for complete search history.

(56) References Cited

U.S. PATENT DOCUMENTS

| | | |
|---|---|---|
| 2010/0200107 A1 | 8/2010 | Weathers et al. |
| 2011/0047972 A1 | 3/2011 | Bauer et al. |
| 2013/0067889 A1 | 3/2013 | Parrish et al. |
| 2013/0276913 A1 | 10/2013 | Tomita et al. |
| 2014/0154142 A1 | 6/2014 | Johnson et al. |
| 2015/0115051 A1* | 4/2015 | Van Vuuren ............ F01N 3/208 239/1 |

FOREIGN PATENT DOCUMENTS

| | | |
|---|---|---|
| CN | 101828012 A | 9/2010 |
| CN | 102272422 A | 12/2011 |
| CN | 202402109 U | 8/2012 |
| DE | 102011088217 A1 | 6/2013 |
| DE | 102012204100 A1 | 9/2013 |
| DE | 102012212560 A1 | 1/2014 |
| EP | 2708710 A2 | 3/2014 |
| EP | 2730762 A1 | 5/2014 |
| GB | 2504358 A | 1/2014 |
| GB | 2504359 A | 1/2014 |

OTHER PUBLICATIONS

First Office Action with English translation from the State Intellectual Property Office of the People's Republic of China for Application No. 201580043644.1 dated Jun. 19, 2018 (13 pages).

* cited by examiner

DIESEL EXHAUST FLUID DELIVERY SYSTEM WITH PRESSURE CONTROL

RELATED APPLICATIONS

This application claims the benefit of U.S. Provisional Application No. 62/037,691 filed Aug. 15, 2014, the entire contents of which are incorporated herein by reference.

BACKGROUND

Diesel exhaust fluid (DEF) is an aqueous urea solution that is used to lower $NO_x$ concentration in diesel exhaust emissions from diesel engines. The present invention relates to DEF delivery systems and mechanisms for controlling the fluid pressure within the system.

SUMMARY

In order to increase the delivery capability of DEF delivery systems that require a return mass flow for operation, an additional valve is introduced to affect the mass flow balance and thereby increase the total delivery of the system. However, because pressure is a variable that can be used to provide accurate dosage, the addition of a new component (i.e., a backflow valve (BFV)) could increase the complexity of the control mechanism for the system.

With the addition of the BFV, the system adds a new control variable transforming the DEF delivery system from a SISO (single input, single output) control system to a MISO (multiple input, single output) control system. The systems and methods described below address a multi-variable control problem of a DEF delivery system with a BFV by decoupling both control variables and making the actuation of each control variable independent of the other. Additionally, the system robustness in failure detection is increased as the simultaneous control of the variables is avoided making it easier to determine the possible reasons for system failure.

In some embodiments, the system decouples the control variables by defining two different control windows based on the requested dosing mass flow (i.e., the amount of DEF to be delivered to the exhaust system). At mass flow rates below a defined threshold, pressure is controlled by a proportional-integral-derivative (PID) controller that controls the actuation of the BFV while the supply pump operates at a constant delivery speed. At mass flow rates above the defined threshold, pressure is PID controlled by varying actuation of the supply pump while the BFV remains fully closed. In some such embodiments, the threshold is defined as the mass flow rate that would require the BFV to be fully closed in order to provide the desired mass flow rate without adjusting the pump speed.

By operating under two different control schemes depending on the mass flow, the determination of the parameters of the PID controllers is simplified as the two control mechanisms do not work against each other simultaneously. This control strategy keeps the diagnostic strategy simplified as the parallel actuation of both control variables would increase the complexity of pin pointing the reason for undesired pressure behavior. Unstable pressure (either too high or too low) at lower mass flow rates is an indicator of improper BFV performance. Unstable pressure (i.e., low pressure) at higher mass flow rates is an indicator of improper pump performance.

In one embodiment, the invention provides a diesel exhaust fluid delivery system that includes a DEF storage tank, a pump, a backflow valve, at least one dosing module, and a controller. The controller is configured to regulate the flow of DEF from the storage tank to the dosing module using a low mass flow strategy when a desired mass delivery flow rate is below a threshold and using a high mass flow strategy when the desired mass delivery flow rate is above the threshold. Under the low mass flow strategy, the controller operates the pump at a constant setting regardless of the desired mass delivery flow rate and controllably opens and closes the backflow valve to allow a portion of the diesel exhaust fluid that is pumped from the storage tank by the pump to flow back into the storage tank—thereby reducing the delivery pressure and achieving the desired mass delivery flow rate. Under the high mass flow strategy, the controller fully closes the backflow valve and adjusts the setting of the pump to achieve the desired mass delivery flow rate. In some embodiments, the pump setting that is adjusted by the controller is pump speed or pump duty cycle.

In another embodiment, the invention provides a method of providing diesel exhaust fluid from a storage tank through a dosing module at a target mass delivery flow rate. When the target mass delivery flow rate is below a threshold, the mass delivery flow rate is adjusted toward the target mass delivery flow rate by operating a pump at a constant operating setting and controlling a backflow valve to allow a portion of the diesel exhaust fluid that is pumped from the storage tank by the pump to flow back into the storage tank—thereby reducing the delivery pressure and achieving the desired mass delivery flow rate. When the target mass delivery flow rate is above the threshold, the backflow valve is fully closed and the operating setting of the pump is adjusted to achieve the target mass delivery flow rate.

In some embodiments, the threshold between the low flow rate control strategy and the high flow rate control strategy is defined as the mass delivery flow rate at which the backflow valve must be fully closed and the pump must be operated at the constant operating setting in order to achieve the target mass delivery flow rate.

Another embodiment of the invention provides a diesel exhaust fluid delivery system. The system includes one or more dosing modules, which are positionable to deliver diesel exhaust fluid to an exhaust system; a fluid storage tank, which stores the diesel exhaust fluid used by the system; a pump, which is coupled to the fluid storage tank and the dosing modules, and which pumps the diesel exhaust fluid from the storage tank to the dosing modules; and a backflow valve, which is coupled to the storage tank, and which controls the amount of the pumped diesel exhaust fluid that is allowed to flow back into the storage tank through a backflow line. The system also includes a controller, which is configured to determine a desired mass flow delivery rate and regulate delivery of the fluid to the exhaust system. When the desired mass flow delivery rate is below the threshold, the controller regulates delivery of diesel exhaust fluid by varying the amount of fluid that is allowed to flow back into the fluid storage tank through the backflow valve. When the desired mass flow delivery rate is above the threshold, the controller regulates delivery of diesel exhaust fluid by adjusting a speed of the pump.

In some embodiments, the system's controller is configured to operate the pump at a constant defined speed when the desired mass flow delivery rate is below the threshold. In some embodiments, the system's controller is configured to fully close the backflow valve to prevent pumped diesel exhaust fluid from flowing back into the storage tank when the desired mass flow delivery rate is above the threshold.

Some embodiments of the invention include a pressure sensor, which is configured to sense the pressure of the diesel exhaust fluid pumped to the dosing modules. The controller uses the sensed pressure to determine an actual mass flow delivery rate, and it adjusts the delivery of the fluid to the exhaust system to cause the actual mass flow delivery rate to approach the desired mass flow delivery rate.

In some embodiments of the system, the controller determines an actual mass flow delivery rate, and compares the actual mass flow delivery rate to the desired mass flow delivery rate. When the actual mass flow delivery rate is greater than the desired mass flow delivery rate, and the desired mass flow delivery rate is below the threshold, the controller adjusts the position of the backflow valve to increase the amount of fluid that is allowed to flow back into the fluid storage tank. When the actual mass flow delivery rate is less than the desired mass flow delivery rate, and the desired mass flow delivery rate is below the threshold, the controller adjusts the position of the backflow valve to decrease the amount of fluid that is allowed to flow back into the fluid storage tank.

In some embodiments of the system, the controller determines an actual mass flow delivery rate, and compares the actual mass flow delivery rate to the desired mass flow delivery rate. When the actual mass flow delivery rate is greater than the desired mass flow delivery rate, and the desired mass flow delivery rate is above the threshold, the controller decreases the speed of the pump. When the actual mass flow delivery rate is less than the desired mass flow delivery rate, and the desired mass flow delivery rate is above the threshold, the controller increases the speed of the pump.

Another embodiment of the invention provides a method for operating a diesel exhaust fluid delivery system. The method includes determining a desired mass flow rate for delivery of diesel exhaust fluid to an exhaust system through one or more dosing modules. When the desired mass flow delivery rate is below a threshold, delivery of the fluid to the exhaust system is regulated by varying the amount of fluid that is allowed to flow back into a fluid storage tank through a backflow valve. When the desired mass flow delivery rate is above the threshold, delivery of the fluid to the exhaust system is regulated by adjusting a speed of a pump configured to pump the fluid from the fluid storage tank to the dosing modules.

In some embodiments, the method also includes operating the pump at a constant defined speed when the desired mass flow delivery rate is below the threshold.

In other embodiments, the method also includes fully closing the backflow valve to prevent pumped diesel exhaust fluid from flowing back into the storage tank when the desired mass flow delivery rate is above the threshold.

In other embodiments of the method, the method includes receiving the pressure of the diesel exhaust fluid pumped to the dosing modules and determining an actual mass flow delivery rate based on the pressure. The delivery of the fluid to the exhaust system is then adjusted to cause the actual mass flow delivery rate to approach the desired mass flow delivery rate.

In some embodiments of the method, the method includes determining an actual mass flow delivery rate and comparing the actual mass flow delivery rate to the desired mass flow delivery rate. In such embodiments, where the desired mass flow delivery rate is below the threshold, the actual mass flow delivery rate is controlled by adjusting the position of the backflow valve. If the actual mass flow delivery rate is greater than the desired mass flow delivery rate, then the position of the backflow valve is adjusted to increase the amount of fluid that is allowed to flow back into the fluid storage tank. If the actual mass flow delivery rate is less than the desired mass flow delivery rate, then the position of the backflow valve is adjusted to decrease the amount of fluid that is allowed to flow back into the fluid storage tank.

In other embodiments of the method, the method includes determining an actual mass flow delivery rate and comparing the actual mass flow delivery rate to the desired mass flow delivery rate. In such embodiments, where the desired mass flow delivery rate is above the threshold, the actual mass flow delivery rate is controlled by adjusting the speed of the pump. If the actual mass flow delivery rate is greater than the desired mass flow delivery rate, then the speed of the pump is decreased. If the actual mass flow delivery rate is less than the desired mass flow delivery rate, then the speed of the pump is increased.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware.

However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
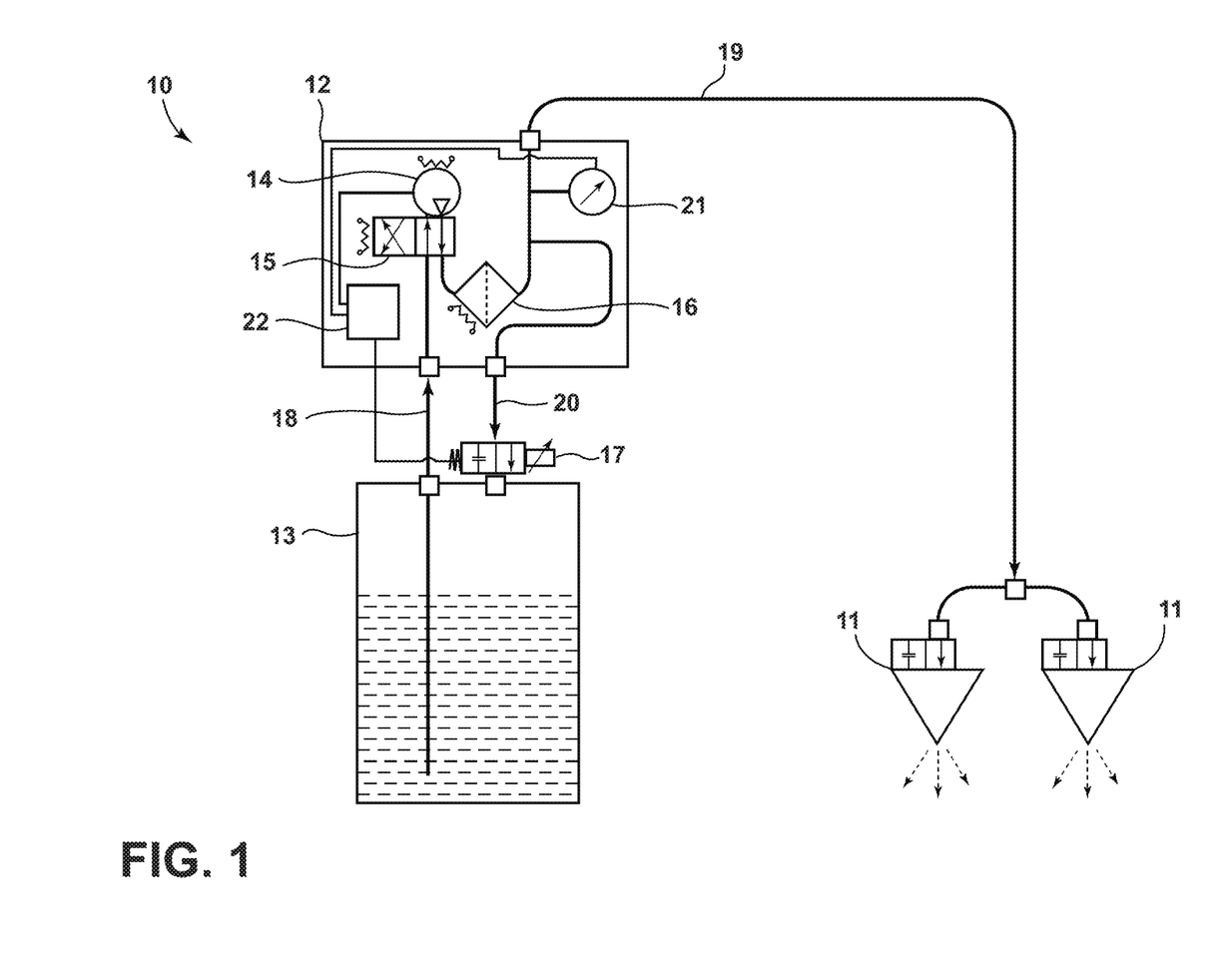
FIG. 1 is a schematic drawing of a diesel exhaust fluid delivery system according to one embodiment.

FIG. 1 illustrates an example of a DEF delivery system 10. The system includes one or more dosing modules 11 for delivering DEF to an exhaust system and a supply module 12 for moving DEF from a storage tank 13 to the dosing modules 11 at a desired, variable pressure or mass delivery flow rate. The supply module 12 includes a pump 14, a reverting valve 15, a main filter 16, and a controllable backflow valve (BFV) 17. The pump 14 draws DEF from the storage tank 13 through a suction line 18 and provides the DEF to the dosing modules 11 through a pressure line 19. The backflow valve 17 controllably allows some of the pumped DEF to flow back into the storage tank 13 through backflow line 20 thereby reducing the pressure of the DEF in the pressure line 19. The supply module 12 also includes a pressure sensor 21 and a controller 22 capable of implementing PID control for the pump 14 and the BFV 17. The controller 22 and the pressure sensor 21 regulate the pressure within the pressure line 19 as described in further detail below. Also, by using a proportional valve as a backflow valve 17, it is possible to adapt the backflow continuously to the dosing amount to hold the overall flow rate constant over a wide range.

In some embodiments, the controller 22 includes a plurality of electrical and electronic components that provide power, operational control, and protection to the components and modules within the controller 22. The controller 22 includes, among other things, a processing unit (e.g., a microprocessor or another suitable programmable device), a memory, and an input/output interface. The processing unit, the memory, and the input/output interface, as well as the other various modules are connected by one or more control or data buses. The use of control and data buses for the interconnection between and communication among the various modules and components would be known to a person skilled in the art in view of the invention described herein. In some embodiments, the controller 22 is implemented partially or entirely on a semiconductor (e.g., a field-programmable gate array ["FPGA"] semiconductor) chip.

The memory includes a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices. The processing unit is connected to the memory and executes software instructions that are capable of being stored in a RAM of the memory (e.g., during execution), a ROM of the memory (e.g., on a generally permanent basis), or another non-transitory computer readable medium. Software included for the processes and methods for the DEF delivery system 10 can be stored in the memory of the controller 22. The software can include firmware, one or more applications, program data, filters, rules, one or more program modules, and other executable instructions. For example, the controller 22 effectively stores information relating to the pressure control of DEF delivery system 10. The processing unit is configured to retrieve from memory and execute, among other things, instructions related to the control processes and methods described herein. In other constructions, the controller 22 includes additional, fewer, or different components.

In this system, the mass flow balance is defined such that the sum of the mass flow rate through the backflow line 20 and the mass flow rate through the pressure line 19 is equal to the mass flow rate through the suction line 18 (i.e., $m_{backflow} + m_{pressure} = m_{suction}$). As such, when operating at a constant suction mass flow rate, the mass flow rate through the backflow line 20 must decrease in order to increase the mass flow rate through the pressure line 19 and vice versa.

Figure 2:
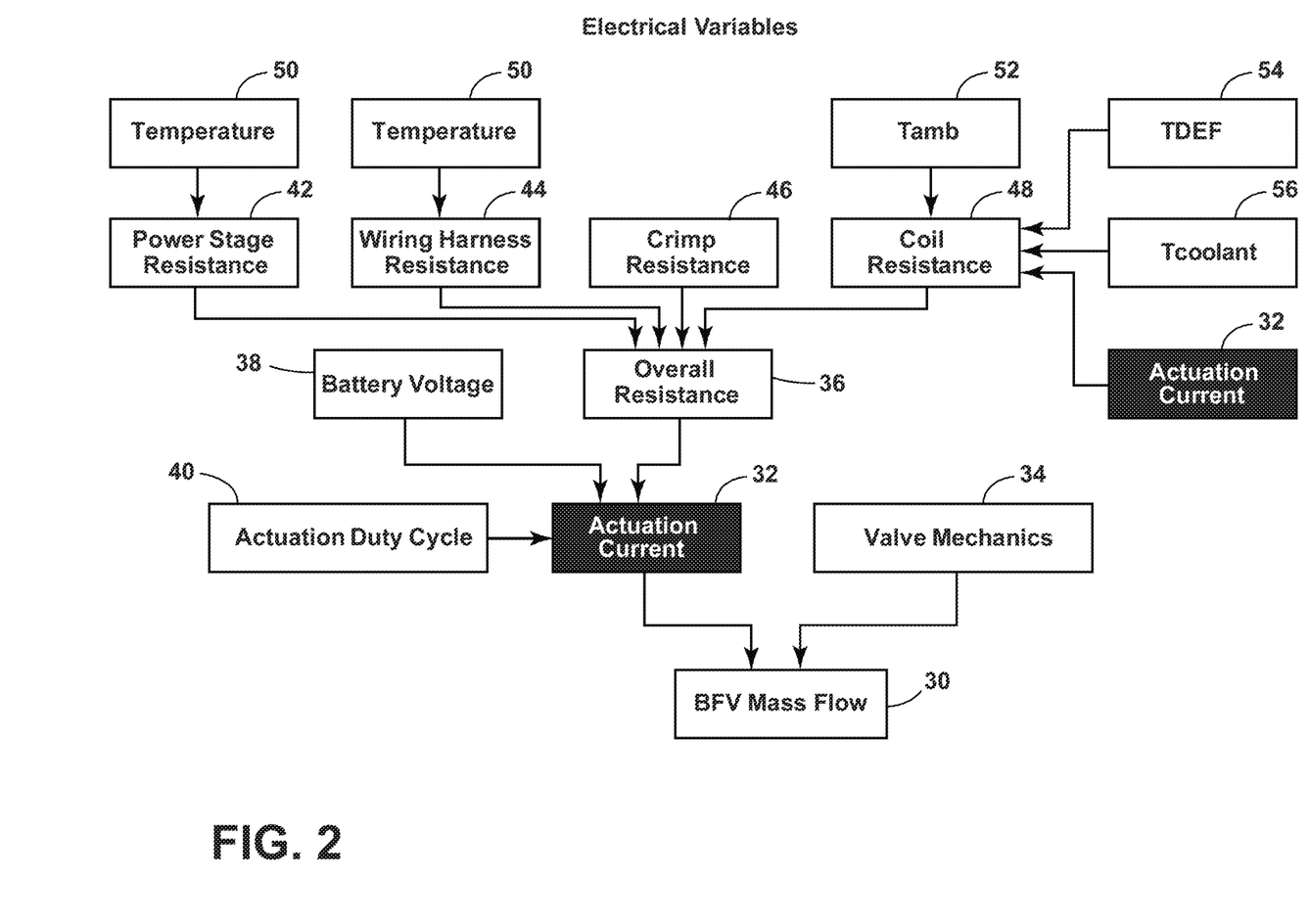
FIG. 2 is a block diagram of various electrical variables that affect the back flow valve mass flow in the system of FIG. 1.
Figure 3:
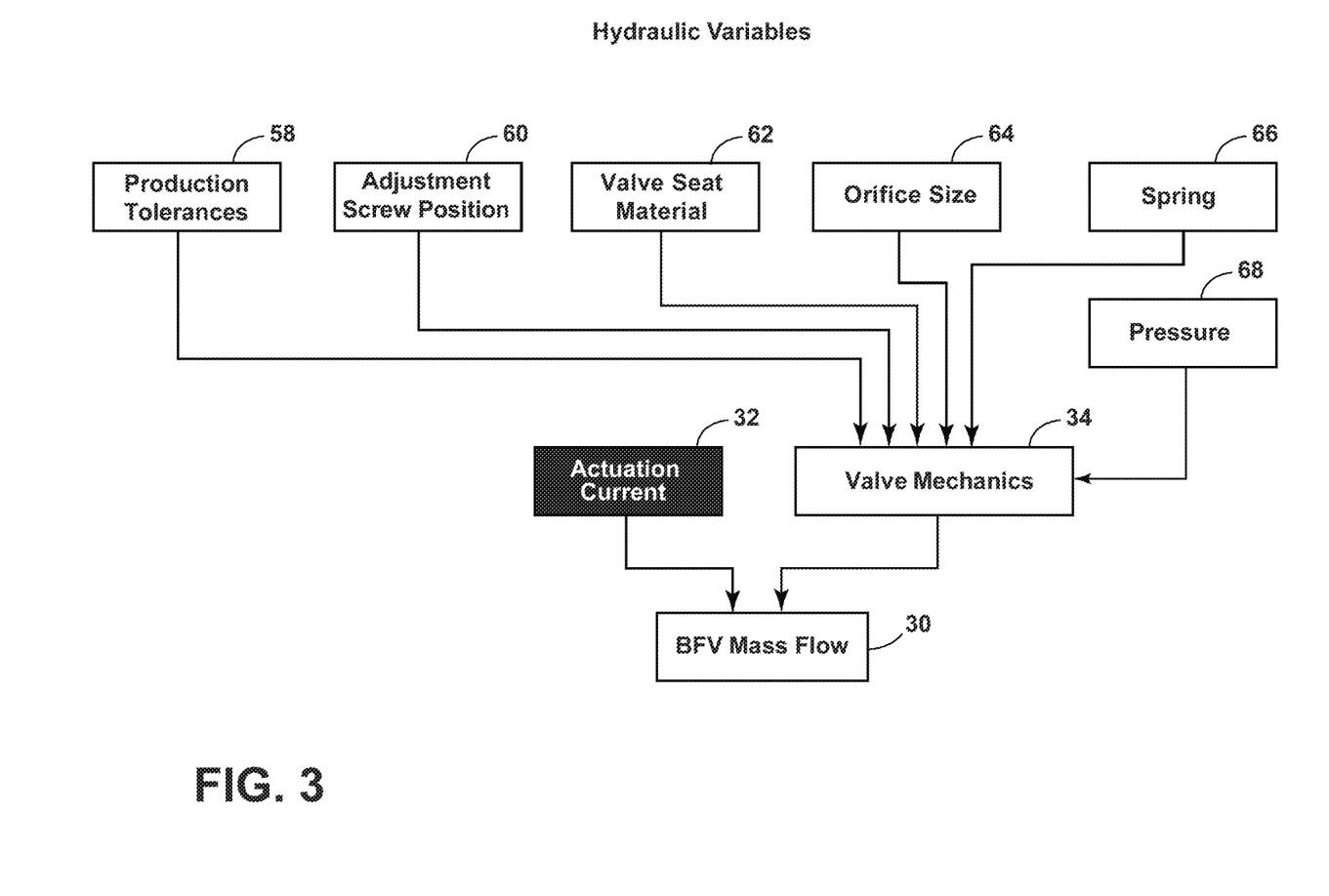
FIG. 3 is a block diagram of various hydraulic variables that affect the back flow valve mass flow in the system of FIG. 1.

There are a large number of electrical and hydraulic variables that can affect the rate of mass flow through the backflow valve 17. FIGS. 2 and 3 illustrate some examples of such variables. BFV mass flow 30 is directly affected by actuation current 32 (i.e., electrical variables) and valve mechanics 34 (i.e., hydraulic/mechanical variables.

FIG. 2 illustrates some of the electrical variables that can affect the actuation current 32 in the DEF delivery system 10. The overall resistance 36 of the BFV system, the battery voltage 38, and the actuation duty cycle 40 of the BFV 17 all affect the actuation current 32. Power stage resistance 42, wiring harness resistance 44, crimp resistance 46, and coil resistance 48 all affect the overall resistance 36. The resistance of each of these components can, however, vary depending upon temperature 50. Particularly, the coil resistance 48 is dependent on ambient temperature ($T_{amb}$) 52, the temperature of the DEF (TDEF) 54, the temperature of system coolant ($T_{coolant}$) 56, and temperature increases due to power losses.

FIG. 3 illustrates some of the hydraulic variables that can affect the valve mechanics 34 in the DEF delivery system 10, which, as noted above, directly affects the BFV mass flow rate. Valve mechanics 34 are affected by production tolerances 58 of the BFV 17, adjustment screw position 60, valve seat material 62, orifice size 64, valve spring 66, and pressure 68 of the DEF in the pressure line 19. Again, the actuation current 32 and the valve mechanics 34 both affect the mass flow rate of the BFV 17.

Figure 4:
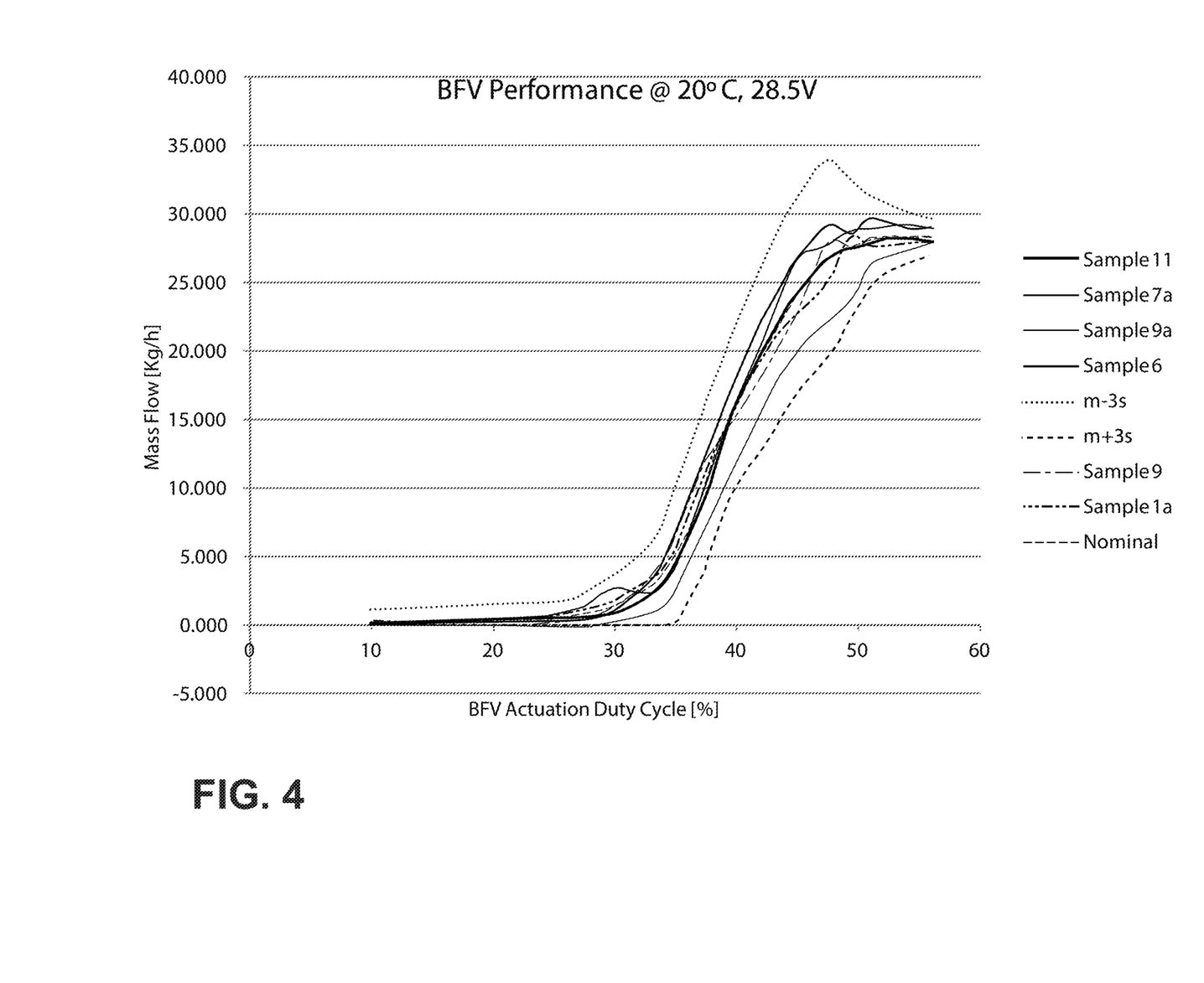
FIG. 4 is a graph of BFV mass flow as a function of the BFV actuation duty cycle at 20 degrees C.

The variance in actual operation due to these variables is illustrated in FIG. 4. FIG. 4 shows the actual mass flow rate as a function of the BFV actuation duty cycle for a variety of samples. The DEF delivery system 10 is operating at an ambient temperature of 20° C. and at 28.5 V in each sample. However, there is demonstrated variation in the measured mass flow rate across the samples.

Figure 5:
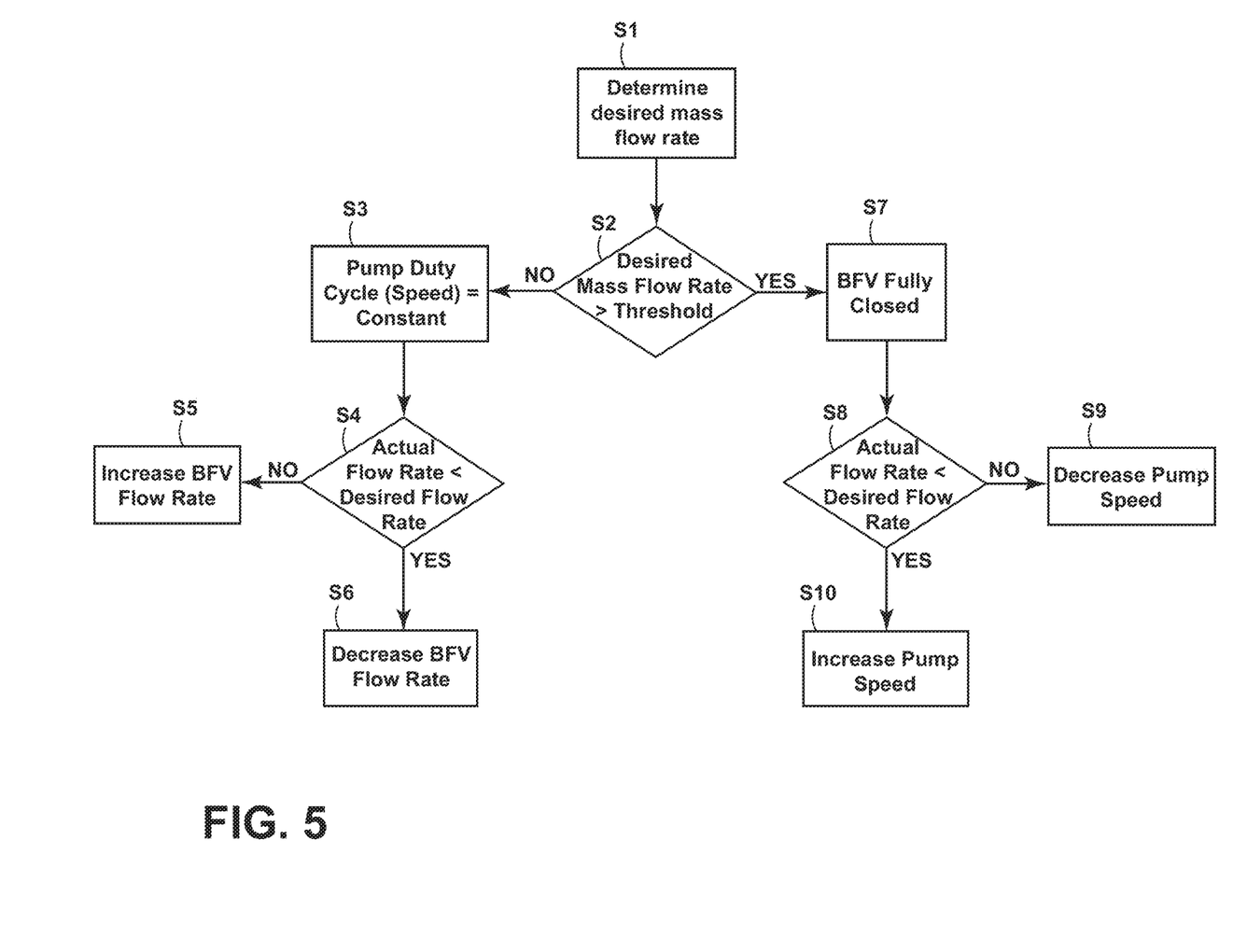
FIG. 5 is a flow chart of a method of controlling the system of FIG. 1 according to a dual-variable control mechanism.

FIG. 5 illustrates a method of operating the DEF delivery system of FIG. 1 using a dual-variable control mechanism. This method addresses the concerns of BFV mass flow rate fluctuations and provides predictable and reliable mass flow delivery through the dosing modules 11. The method provides for two operating modes: low flow rate and high flow rate. While operating in the low flow rate operating mode, the speed/duty cycle of the pump 14 remains constant and the pressure of the DEF in the pressure line 19 is adjusted by controlling the mass flow returning to the storage tank 13 through the BFV 17. While operating in the high flow rate operating mode, the BFV 17 is fully closed and the speed of pump 14 is adjusted/controlled to regulate the pressure of the DEF in the pressure line 19.

In step S1, the controller 22 determines the desired mass flow rate. In step S2, the desired mass flow rate is compared to a threshold. If the desired mass flow rate is less than a threshold, then the system is operated in a low flow rate operating mode. In step S3, the pump 14 is set to a constant duty cycle or speed (or other operating parameter). In step S4, the actual mass flow rate is compared to the desired mass flow rate. If the actual mass flow rate is greater than the desired mass flow rate, the BFV 17 is adjusted in step S5 to allow greater mass flow of DEF through BFV 17 and backflow line 20 into the storage tank 13. This increase in backflow of DEF reduces the pressure of the DEF in the pressure line 19, thereby reducing the actual mass flow rate. If, however, the actual mass flow rate is less than the desired mass flow rate, the BFV 17 is adjusted in step S6 to decrease the amount of DEF that is allowed to flow through the BFV 17 and backflow line 20 into the storage tank 13. This decrease in backflow of DEF increases the pressure of the DEF in the pressure line 19, thereby increasing the actual mass flow rate. Thus, the method provides that while operating in the low flow rate operating mode, the speed/duty cycle of the pump 14 remains constant and the pressure of the DEF in the pressure line 19 is adjusted by controlling the mass flow through the BFV 17.

If, however, in step S2, the desired mass flow rate is greater than the threshold, the system is operated in a high flow rate operating mode. In step S7, the BFV 17 is fully closed. In step S8, the actual mass flow rate is compared to the desired mass flow rate. If the actual mass flow rate is less than the desired mass flow rate, then the speed of pump 14 is increased in step S10, which increases the pressure of the DEF in the pressure line 19, thereby increasing the actual mass flow rate. If the actual mass flow rate is greater than the desired mass flow rate, then speed of pump 14 is decreased in step S9, which decreases the pressure of the DEF in the pressure line 19, thereby decreasing the actual mass flow rate.

Figure 6:
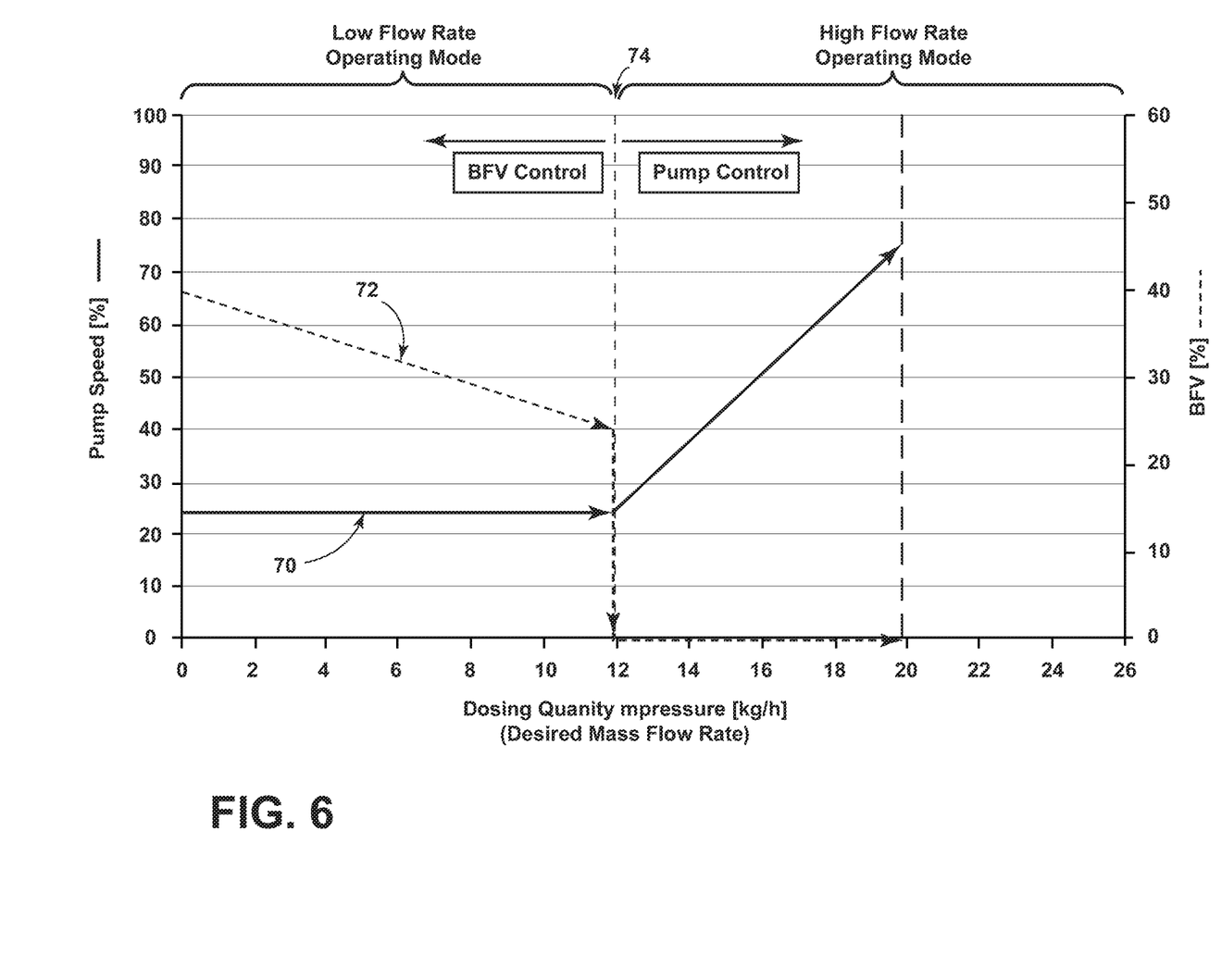
FIG. 6 is a graph of pump speed and backflow valve duty cycle as a function of dosing quantity for the system of FIG. 1 operating according to the method of FIG. 5.

FIG. 6 illustrates the pump speed 70 and BFV duty cycle 72 as a function of the dosing quantity (desired mass flow rate) according to the method of FIG. 5. The pump speed 70 is shown as a percentage of the maximum pump speed. The BFV duty cycle 72 represents the position of the valve as a percentage of "openness," with 100% corresponding to a fully open valve, and 0% corresponding to a fully closed valve. When the dosing quantity is below the threshold 74 and the system 10 is operating in the low flow rate operating mode (BFV control mode), the pump speed 70 remains constant while the BFV duty cycle 72 decreases as the desired mass flow rate increases. When the dosing quantity is above the threshold 74 and the system 10 is operating in the high flow rate operating mode (pump control mode), the BFV valve is fully closed, decreasing BFV flow rate 72 to zero, while the pump speed 70 is increased as the desired mass flow rate increases.

The threshold can be defined based on operational preferences and system design. The threshold may be defined as a constant value—for example, in FIG. 6, the threshold is set at 12 kg/h. Alternatively, the system 10 may implement a varying threshold that is adjusted based on operating conditions (e.g., temperature). In some systems, the threshold may be defined based on the mass flow rate that would generally be achieved if the BFV were placed in the fully closed position and the pump were operated at the constant speed of the "low flow rate" operating mode.

The system 10 may also implement a floating threshold. For example, the system 10 may be configured to switch from the "low flow rate" operating mode to the "high flow rate" operating mode when the desired mass flow rate reaches a level where the control mechanism can no longer raise the mass flow rate by adjusting the BFV (i.e., the BFV is already fully closed). Similarly, the system 10 may be configured to switch from the "high flow rate" operating mode to the "low flow rate" operating mode when a high flow rate control mechanism would dictate that the pump be operated below a define speed threshold.

At the transition point from one operating mode to the other, the integrator portions of the PID controls for the pump 14 and the BFV 17 are reset to ensure that the transition between modes goes smoothly and does not significantly influence the pressure in the system 10. The reset values depend on the sensitivity of the actuator being controlled. (In this case, sensitivity is a measure of the rate of change of the output for a given input: the higher change in mass flow for a given change in actuation duty cycle, the higher the sensitivity.) The pump 14 in system 10 is not highly sensitive, therefore the reset value for the PID controlling the pump 14 can be reset to the expected pump duty cycle of a nominal part, which is based on the actual dosing request. However, a fixed reset value cannot be determined for the BFV 17 because of the wide range of duty cycle values that the BFV can take based on the boundary conditions, as shown in FIG. 2. In addition, the BFV 17 is the fastest actuator in system 10, and it has a high sensitivity. Accordingly, the controller 22 must accurately determine a reset value for the BFV 17. The controller 22 determines the value by learning it during certain portions of the operation of the BFV 17. The value is learned when the following conditions exist for a period of time sufficient to learn the value: the dosing request is at or near zero, the system is operating to meter the mass flow, and the pressure is within a range of 8900 and 9100 mbar. The reset value for the PID controller is updated whenever the conditions are met. BFV 17 duty cycles for different mass flow dosing requests can be determined using the learned duty cycle reset value.

Figure 7:
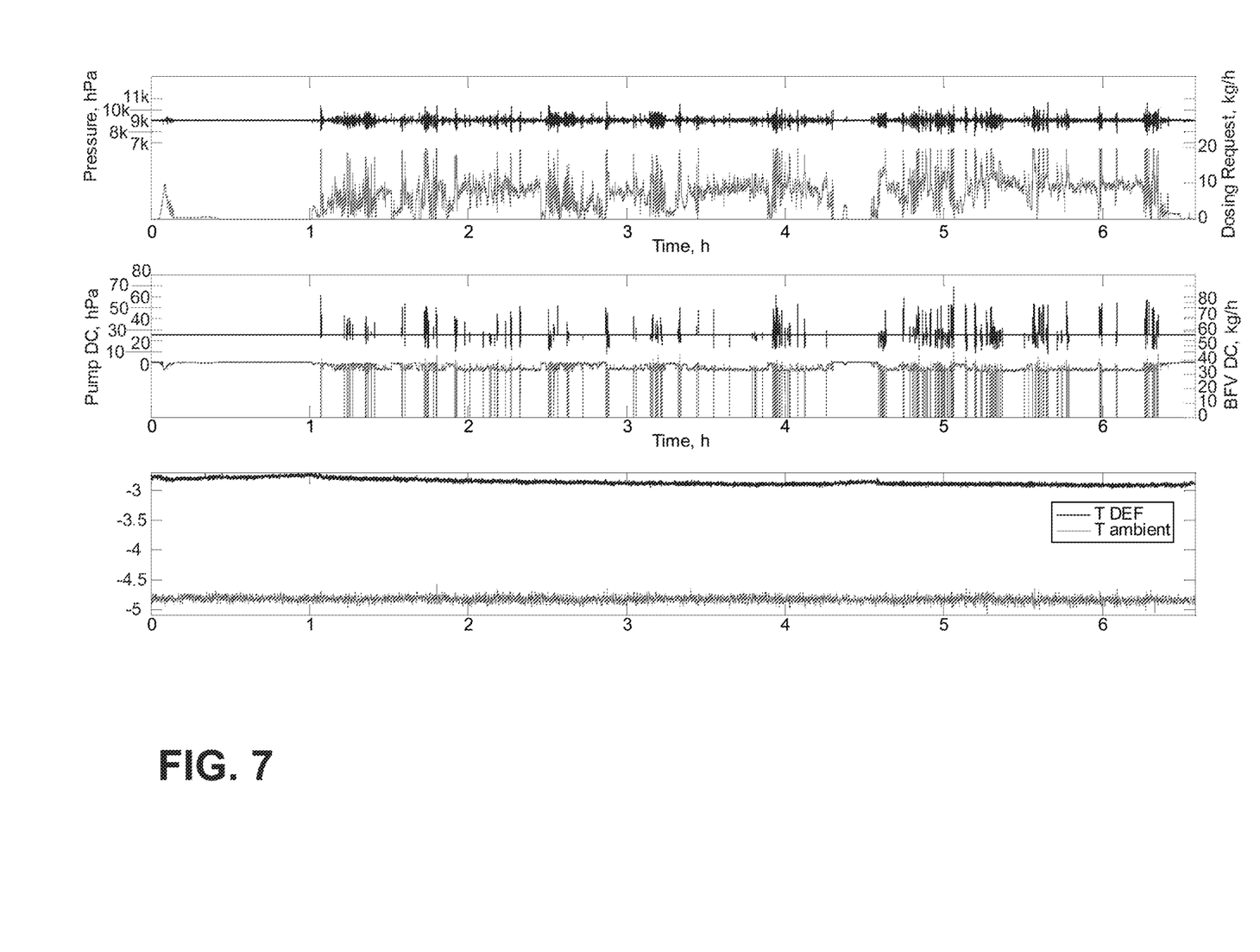
FIG. 7 is a graph of experimental results of various pressure values within the system of FIG. 1 as a function of time while operating at −5 degrees C.
Figure 8:
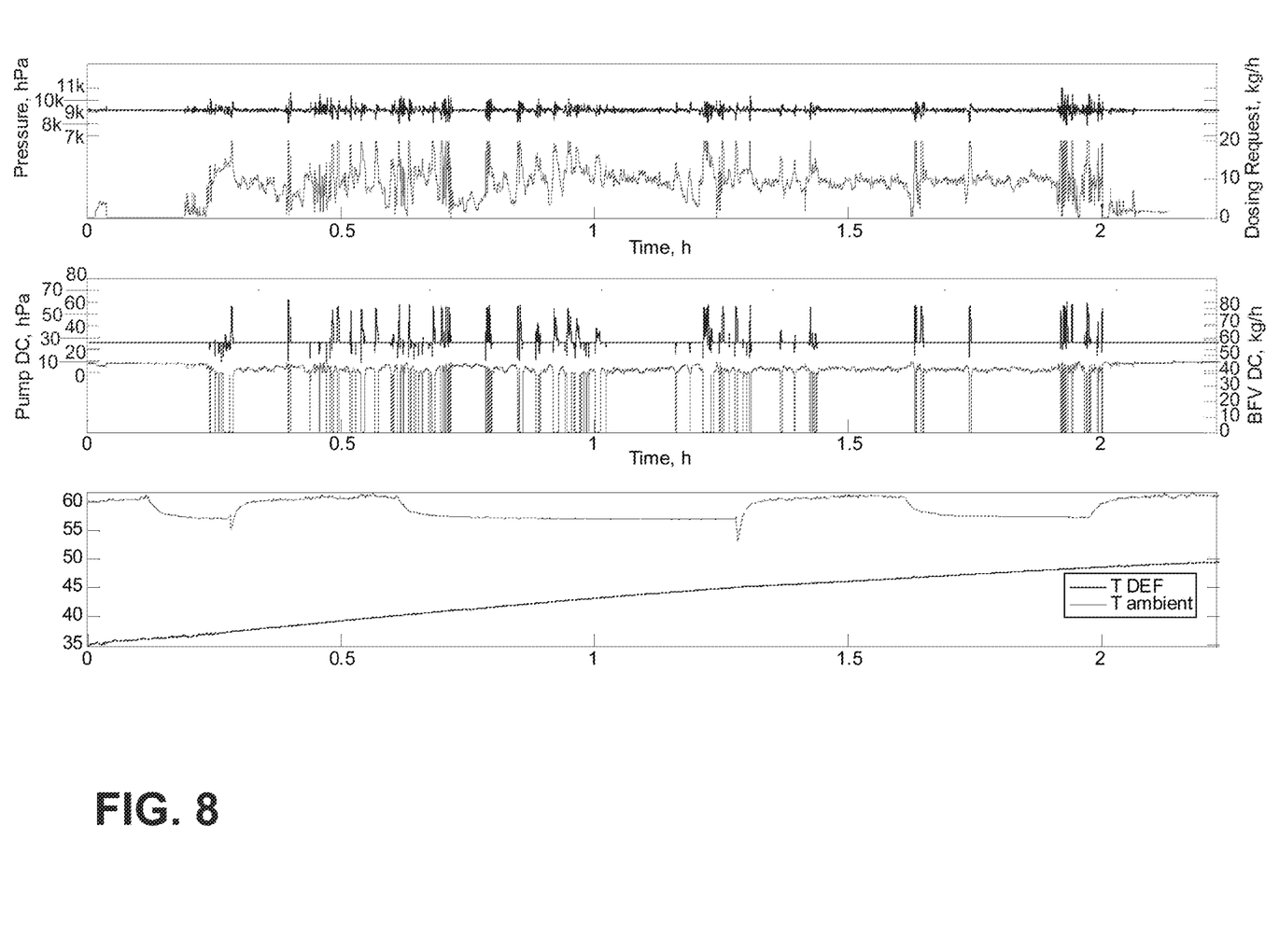
FIG. 8 is a graph of experimental results of various pressure values within the system of FIG. 1 as a function of time while operating at 60 degrees C.
Figure 9:
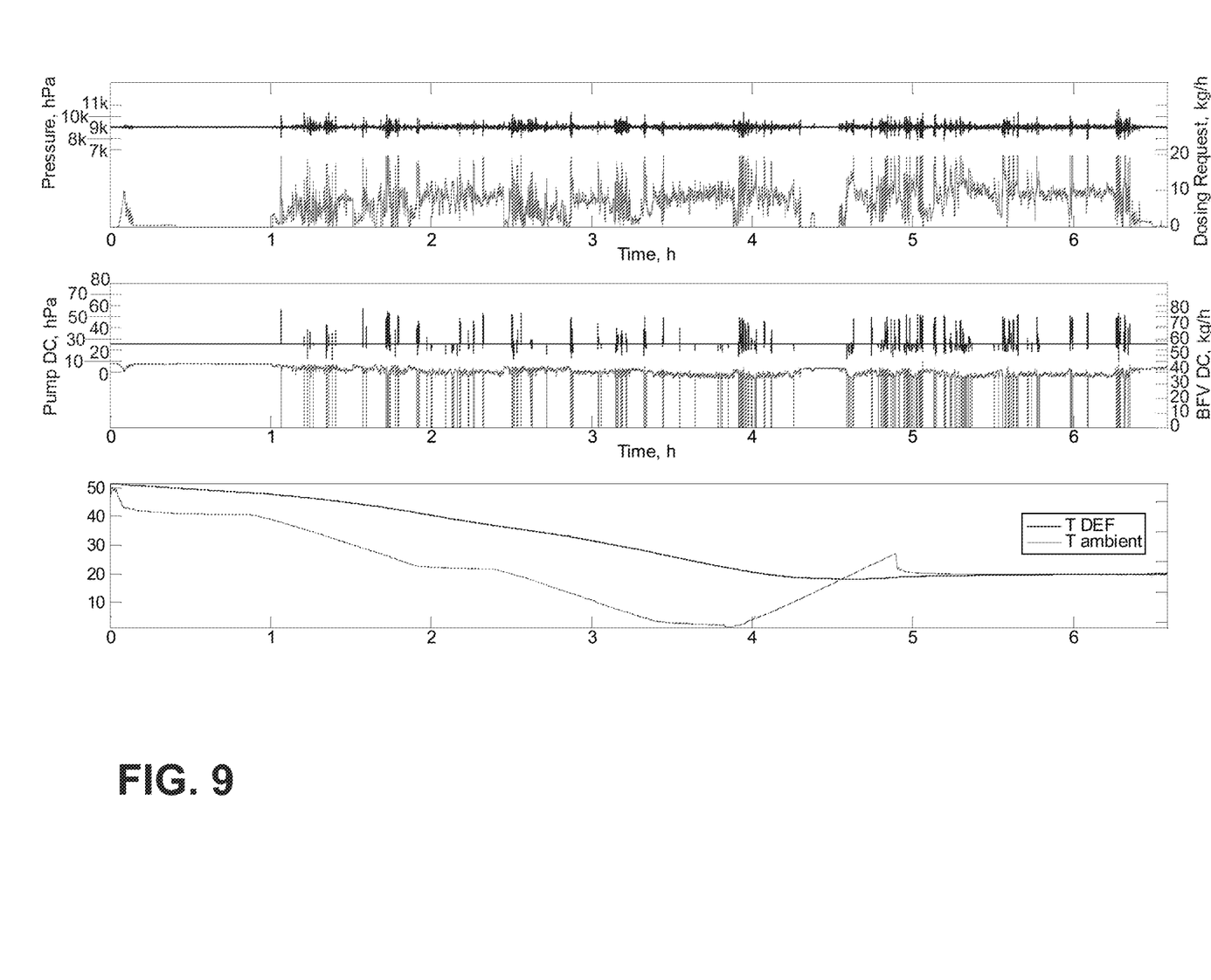
FIG. 9 is a graph of experimental results of various pressure values within the system of FIG. 1 as a function of time while operating across transient and variable temperatures.

The closed loop system illustrated in FIGS. 5 and 6 reduces or eliminates the temperature dependency of the control system. Furthermore, BFV production tolerances are compensated for. FIGS. 7, 8, and 9 illustrate various experimental data from the system of FIG. 1 using the control mechanism of FIGS. 5 and 6. The top graph in each figure illustrates the pressure in the pressure line 19 and the dosing request (desired mass flow rate) as a function of time. The middle graph in each figure shows the speed of pump 14 (Pump DC) as demonstrated by the drawing pressure of the pump in hPa and the flow rate of the BFV 17 (BFV DC) in kg/h both as functions of time. The bottom graph in each figure shows the temperature of the DEF in the storage tank 13 and the ambient temperature during system operation as a function of time. In FIG. 7, the system is operated at −5° C. In FIG. 8, the system is operated at an ambient temperature of approximately 60° C. In FIG. 9, the ambient temperature is varied between 50° C. and 0° C.

Thus, the invention provides, among other things, a diesel exhaust fluid delivery system and a dual-variable control strategy for adjusting the delivery pressure and the mass flow rate of the fluid passing through the system. Various features and advantages of the invention are set forth in the accompanying drawings.

What is claimed is:

1. A diesel exhaust fluid delivery system, the system comprising:
   one or more dosing modules positionable to deliver a fluid to an exhaust system;
   a fluid storage tank;
   a pump coupled to the fluid storage tank and the one or more dosing modules to pump the fluid from the storage tank to the one or more dosing modules;
   a backflow valve coupled to the storage tank to controllably allow an amount of the pumped fluid to flow back into the storage tank through a backflow line;
   an electronic controller configured to
      determine a target mass flow delivery rate,
      regulate delivery of the fluid to the exhaust system by varying the amount of fluid that is allowed to flow back, via the backflow valve, into the fluid storage tank through the backflow valve when the target mass flow delivery rate is below a threshold, and
      regulate delivery of the fluid to the exhaust system by adjusting a speed of the pump when the target mass flow delivery rate is above the threshold.

2. The diesel exhaust fluid delivery system of claim 1, wherein the electronic controller is further configured to operate the pump at a constant defined speed when the target mass flow delivery rate is below the threshold.

3. The diesel exhaust fluid delivery system of claim 1, wherein the electronic controller is further configured to fully close the backflow valve and prevent pumped fluid from flowing back into the storage tank when the target mass flow delivery rate is above the threshold.

4. The diesel exhaust fluid delivery system of claim 1, further comprising a pressure sensor configured to sense a pressure of the fluid pumped to the one or more dosing modules, wherein the electronic controller is further configured to regulate delivery of the fluid to the exhaust system by determining an actual mass flow delivery rate based on a signal from the pressure sensor, and adjusting the delivery of the fluid to the exhaust system to cause the actual mass flow delivery rate to approach the target mass flow delivery rate.

5. The diesel exhaust fluid delivery system of claim 1, wherein the electronic controller is further configured to:
   determine an actual mass flow delivery rate, compare the actual mass flow delivery rate to the target mass flow delivery rate,
   adjust a position of the backflow valve to increase the amount of fluid that is allowed to flow back into the fluid storage tank when the actual mass flow delivery rate is greater than the target mass flow delivery rate and the target mass flow delivery rate is below the threshold, and
   adjust the position of the backflow valve to decrease the amount of fluid that is allowed to flow back into the fluid storage tank when the actual mass flow delivery rate is less than the target mass flow delivery rate and the target mass flow delivery rate is below the threshold.

6. The diesel exhaust fluid delivery system of claim 1, wherein the electronic controller is further configured to:
   determine an actual mass flow delivery rate, compare the actual mass flow delivery rate to the target mass flow delivery rate,
   decrease the speed of the pump when the actual mass flow delivery rate is greater than the target mass flow delivery rate and the target mass flow delivery rate is above the threshold, and
   increase the speed of the pump when the actual mass flow delivery rate is less than the target mass flow delivery rate and the target mass flow delivery rate is above the threshold.

7. A method for operating a diesel exhaust fluid delivery system, the method comprising:
   using an electronic controller to determine a target mass flow rate for delivery of a fluid to an exhaust system through one or more dosing modules,
   regulating delivery of the fluid to the exhaust system by varying the amount of fluid that is allowed to flow back into a fluid storage tank through a backflow valve when the target mass flow delivery rate is below a threshold, and
   regulating delivery of the fluid to the exhaust system by adjusting a speed of a pump configured to pump the fluid from the fluid storage tank to the one or more dosing modules when the target mass flow delivery rate is above the threshold.

8. The method of claim 7, further comprising: operating the pump at a constant defined speed when the target mass flow delivery rate is below the threshold.

9. The method of claim 7, further comprising: fully closing the backflow valve and prevent pumped fluid from flowing back into the storage tank when the target mass flow delivery rate is above the threshold.

10. The method of claim 7, further comprising:
    receiving a pressure of the fluid pumped to the one or more dosing modules,
    determining an actual mass flow delivery rate based on the pressure, and
    adjusting the delivery of the fluid to the exhaust system to cause the actual mass flow delivery rate to approach the target mass flow delivery rate.

11. The method of claim 7, further comprising:
    determining an actual mass flow delivery rate,
    comparing the actual mass flow delivery rate to the target mass flow delivery rate,
    adjusting a position of the backflow valve to increase the amount of fluid that is allowed to flow back into the fluid storage tank when the actual mass flow delivery rate is greater than the target mass flow delivery rate and the target mass flow delivery rate is below the threshold, and
    adjusting the position of the backflow valve to decrease the amount of fluid that is allowed to flow back into the fluid storage tank when the actual mass flow delivery rate is less than the target mass flow delivery rate and the target mass flow delivery rate is below the threshold.

12. The method of claim 7, further comprising:
    determining an actual mass flow delivery rate,
    comparing the actual mass flow delivery rate to the target mass flow delivery rate,
    decreasing the speed of the pump when the actual mass flow delivery rate is greater than the target mass flow delivery rate and the target mass flow delivery rate is above the threshold, and
    increasing the speed of the pump when the actual mass flow delivery rate is less than the target mass flow delivery rate and the target mass flow delivery rate is above the threshold.

* * * * *